United States Patent

Mizuta

[11] Patent Number: 5,198,647
[45] Date of Patent: Mar. 30, 1993

[54] PLURAL-COIL NON-CONTACT IC CARD HAVING POT CORES AND SHIELDING WALLS

[75] Inventor: Masaharu Mizuta, Itami, Japan

[73] Assignee: Mitsubishi Denki Kabushiki Kaisha, Tokyo, Japan

[21] Appl. No.: 618,402

[22] Filed: Nov. 27, 1990

[30] Foreign Application Priority Data

Nov. 28, 1989 [JP] Japan .................................. 1-306713
Dec. 13, 1989 [JP] Japan .................................. 1-321473
Apr. 12, 1990 [JP] Japan .................................. 2-94948

[51] Int. Cl.⁵ ...................... G06K 19/07; H01F 15/02; H01F 15/04
[52] U.S. Cl. ................... 235/449; 235/493; 336/83; 336/84 C
[58] Field of Search ............. 235/493, 492, 449, 382; 340/825.54, 825.31; 336/83, 84 R, 84 C, 90, 96, 205

[56] References Cited

U.S. PATENT DOCUMENTS

| 4,605,844 | 8/1986 | Haggan | 235/380 |
| 4,650,981 | 3/1987 | Foletta | 235/449 |
| 4,692,604 | 9/1987 | Billings | 235/493 |
| 4,818,853 | 4/1989 | Ohta et al. | 235/492 |

Primary Examiner—John W. Shepperd
Assistant Examiner—Edward Sikorski
Attorney, Agent, or Firm—Leydig, Voit & Mayer

[57] ABSTRACT

In a non-contact IC card based on an electromagnetic induction system, N small thin-film coils formed by thin-film technology are arranged to perform N-bit parallel data transfer at an increased data transfer rate. Each thin-film coil may be constructed with a pot core to solve a problem relating to errors in positioning the card relative to a terminal unit and thereby improving the reliability of data transfer. Shielding walls may be provided between the adjacent thin-film coils to prevent interference therebetween. The N thin-film coils are integrally formed as a thin-film coil module.

7 Claims, 12 Drawing Sheets

PLURAL-COIL NON-CONTACT IC CARD HAVING POT CORES AND SHIELDING WALLS

BACKGROUND OF THE INVENTION

1. FIELD OF THE INVENTION

This invention relates to non-contact type IC cards durable under the presence of contaminants or dust and, more particularly, to an IC card having an electromagnetic induction interface using coils.

2. DESCRIPTION OF THE RELATED ART

A type of IC card which can be effectively improved by the present invention, i.e., an IC memory card which performs parallel transfer of 8-bit (N=8) data will be described below.

IC memory cards (hereinafter referred to as IC cards) are grouped into (1) a multiple pin type and (2) a non-contact type with respect to the method of connection to terminal units, as described on page 24 of "IC card" edited by Denshi Joho Tsushin Gakkai and published by Ohmsha, Ltd. In the case of multiple pin type cards, data exchange can be performed between the IC card and the terminal by 8-bit or 16-bit parallel data transfer, and data can be read from or written in the card at a high speed of about 200 nsec/byte at present. Non-contact type cards have no contact portions and are therefore free from various problems due to mechanical contacts. Non-contact type cards can be used in a bad operating environment such as a factory automation environment since they can have a completely sealed structure. Non-contact systems are advantageous when used as a means for solving the following problems relating to the connection method for multiple pin type IC cards:

(1) a change in internal data or breakdown of internal ICs caused by static electricity entering through connector terminals, (2) data error or a transmission/reception disabled state due to terminal contact failure, (3) failure of connection between the card and the terminal unit due to deformation (spreading) of terminals, and (4) a need for a large insertion/withdrawal force to an ejection mechanism owing to the existence of many pins.

Light, electromagnetic induction or microwaves may be used as a means for supplying power or effecting transmission/reception in a non-contact manner. For non-contact IC cards presently put to practical use, however, a type of electromagnetic induction system which uses what is ordinarily called a sheet coil is adopted for portability, power consumption and performance of the card.

Figure 13:
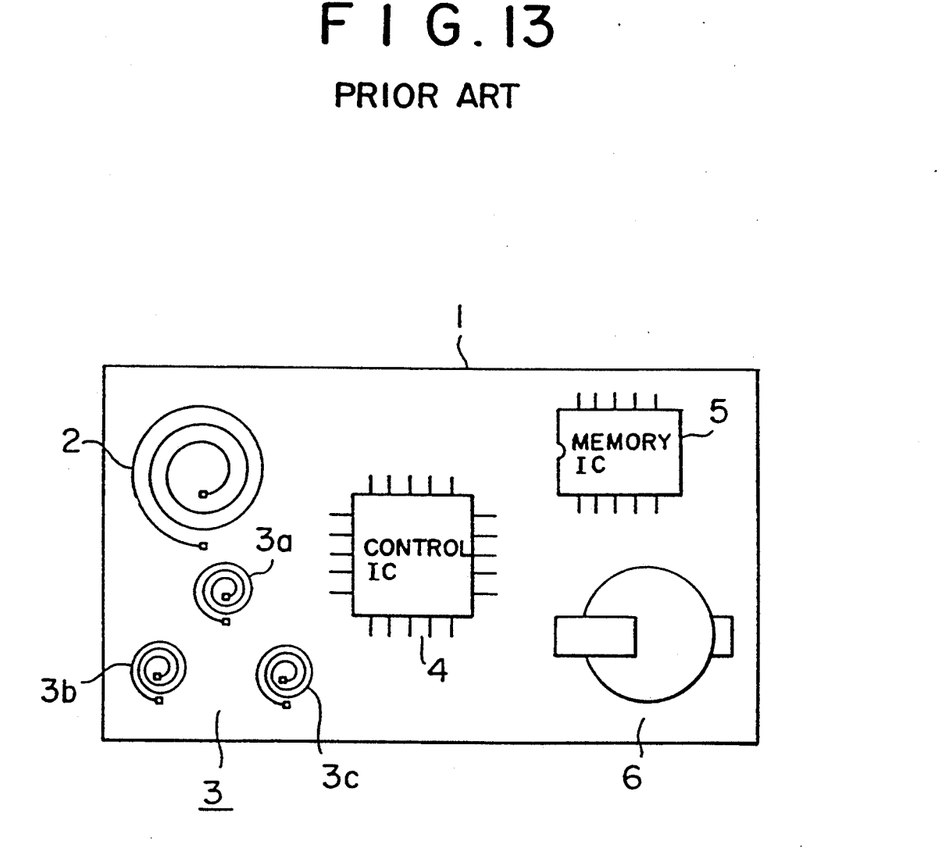
FIG. 13 is a schematic illustration of internal parts of a conventional sheet coil type IC card in a mounted state.
Figure 14:
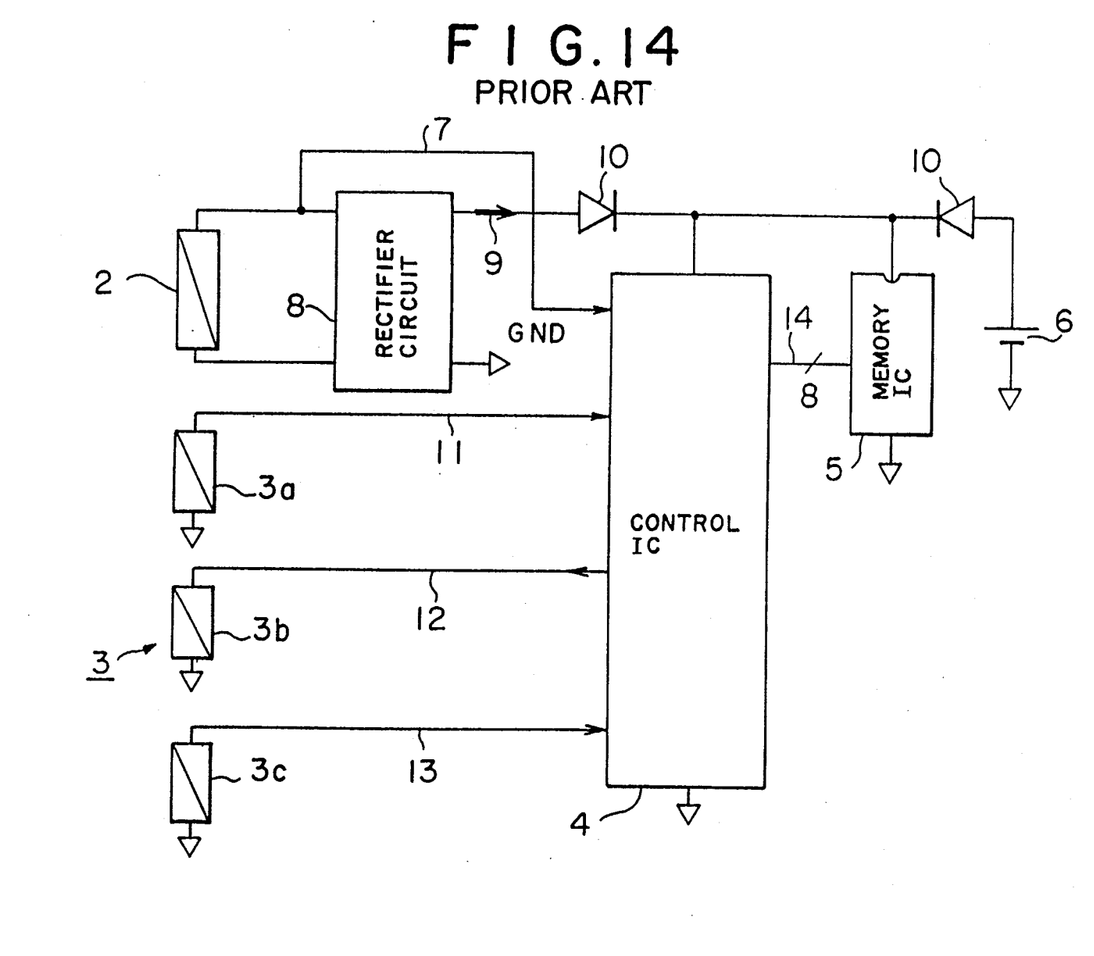
FIG. 14 is a block diagram of the electrical connection of the IC card shown in FIG. 13.

FIG. 13 is a schematic illustration of internal parts of a conventional sheet coil type IC card in a mounted state. As illustrated, a large sheet coil 2, three small sheet coils 3, a control IC 4, a memory IC 5 and a battery 6 are mounted on a printed circuit board 1. The large sheet coil 2 is a coil for receiving power and clock signals supplied from a terminal unit to the IC card (hereinafter referred to as a "power coil"). The small sheet coil 3 consists of three coils, for example, a data receiving coil 3a, a data transmitting coil 3b, and an instruction signal receiving coil 3c. The sheet coils 2 and 3 are formed in the same manner as the conventional pattern formation on a printed circuit board (not specifically illustrated). The memory IC 5 is an IC for storing data, and the control IC 4 is an IC for controlling reading of data from the memory IC 5 or writing data in the memory IC 5 based on an instruction signal received by the sheet coil 3c. The battery 6 is an internal battery for maintaining the data in the memory IC 5. FIG. 14 is a block diagram of the electrical connection of the IC card shown in FIG. 13. A part of the signal obtained by the power coil 2 is supplied to the control IC 4 through a clock signal line 7 and the part rectified by the rectifier circuit 8 is supplied as DC power 9 to the control IC 4 and the memory IC 5. Two diodes 10 serve to stop DC currents from the rectifier circuit 8 and the battery 6 from reversely flowing to the power source. A received data line 11 serves to deliver received data from the receiving coil 3a to the control IC 4. A transmitted data line 12 serves to deliver transmitted data from the control IC 4 to the transmitting coil 3b. An instruction signal line 13 serves to deliver an instruction signal obtained by the instruction signal receiving coil 3c to the control IC 4. All signal exchanges between the card and the external unit (not shown) to which the card is connected are effected by using serial signals. Data exchange between the control IC 4 and the memory IC 5 is carried out by sending through an 8-bit data bus 14 8-bit parallel data into which the serial data is converted, if the control IC 4 has a parallel/serial data conversion function. Sheet coils (not shown) corresponding to the sheet coils 2 and 3 are provided on the terminal side in positions such as to respectively face the sheet coils on the card side while being maintained close to the same, when the card is connected to the terminal. Currents induced in the sheet coils on the IC card side have differential waveforms. Capacitors having small capacitances (not shown) are connected to the signal lines 7, 11, 12 and 13 shown in FIG. 14 to convert, by integration, the differential waveform induction currents into signals which can be processed or used by the control IC 4. This type of IC card further includes several control signal lines, address lines and the like, which will not be specifically described in detail.

As mentioned above, the conventional sheet coils 2 and 3 shown in FIGS. 13 and 14 are formed in the same manner as printed circuit board patterns. That is, a copper foil is formed on the base by plating, and a resist is applied to portions of the copper foil layer which are to be left, i.e., portions for forming spiral coil conductors, and etching is thereafter performed. After the etching, the resist is removed. The sheet coils thereby formed have small sizes; for example, the power coil 2 has a larger size, a diameter of about 20 mm (the number of turns: about 20), and each of the receiving coil 3a, the transmitting coil 3b and the instruction signal receiving coil 3c has a smaller size, a diameter of about 10 mm (the number of turns: about 5).

The non-contact IC card having this electromagnetic induction system performs serial data transmission as mentioned above. The data transfer rate is 500 kbits/sec (2 μsec/bit), which is higher than the data transfer rates of other non-contact systems. This rate is, in terms of the rate of byte transfer for transferring 8-bit data parallel, about 60 kbytes/sec (16 μsec/byte) which is much lower than 5 m bytes/sec (200 nsec/byte) of the multiple pin type IC cards basically designed for parallel transfer. This non-contact transfer system is therefore unsuitable for data transmission/reception using an IC card having a large capacity of several hundred bytes.

Figure 15:
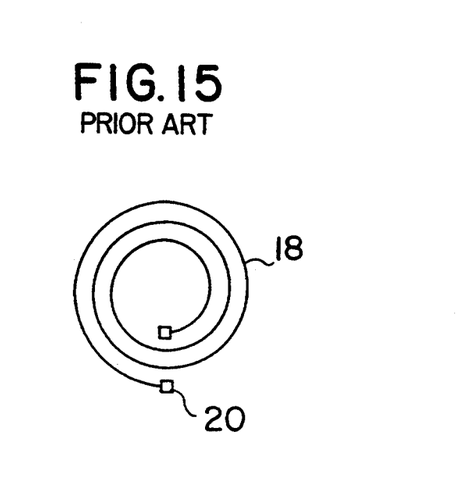
FIG. 15 is an enlarged plan view of one of the sheet coils shown in FIG. 13.
Figure 16A:
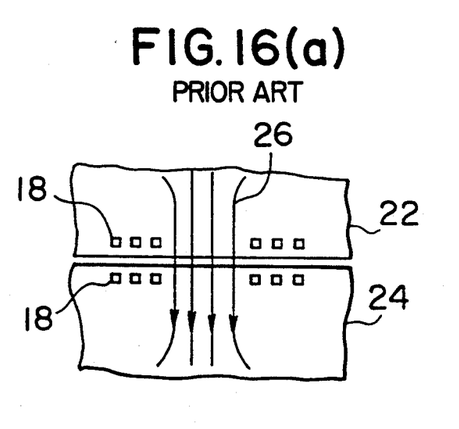
FIG. 16(a) and 16(b) are sectional side views of lines of magnetic force produced when the sheet coils of the conventional IC card and the terminal facing each other are coupled by electromagnetic induction.
Figure 16B:
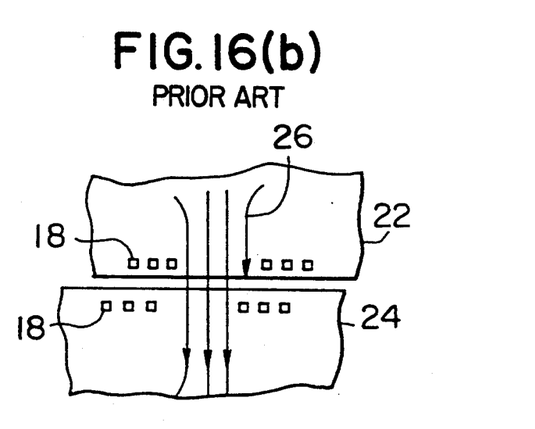

FIG. 15 is an enlarged plan view of one of the sheet coils shown in FIG. 13, FIG. 16(a) is a schematic sectional side view of portions of the IC card and the terminal connected in an aligned state, showing lines of magnetic force when the sheet coils of the IC card and the terminal facing each other are connected by electromagnetic induction coupling, and FIG. 16(b) is a schematic sectional side view showing lines of magnetic force when these sheet coils are electromagnetic-induction coupled in slightly shifted positions. As shown in FIG. 15, pads or lands 20 are provided for electrical connection at the two ends of a coil winding 18. As shown in FIG. 16(a), when the IC card is correctly set on the terminal, almost all lines of magnetic force 26 produced by a sheet coil 22 on the terminal side interlink with a sheet coil 24 provided on the IC card side and facing the sheet coil 22 while being maintained close to the same, a current is induced in the sheet coil 24 in accordance with the Lenz's law, thereby transferring the signal in a non-contact manner. If the IC card is placed on the terminal in a shifted position as shown in FIG. 16(b), only part of the lines of magnetic force 26, e.g., ¾ of the same interlink with the sheet coil 24, so that the electromotive force induced in the sheet coil 24 is reduced to ¾, and that the induced current is correspondingly reduced to ¾. The degree of coupling for data transmission and the reliability of the non-contact system are thereby reduced.

In the electromagnetic induction non-contact IC card thus constructed, the sheet coils for transmitting signals in a non-contact manner occupy a large area on the printed circuit board. The provision of these sheet coils makes it difficult to develop large-capacity IC cards in which many memory ICs are mounted on the printed circuit board. To further increase the data transfer rate, the present serial data transmission system may be replaced with, for example, a parallel data transmission system for transmitting 8-bit data parallel. In such a case, there is a need for a further increase in the number of coils arranged, and it is therefore difficult to construct the card for parallel data transmission. Moreover, the degree of electromagnetic induction coupling is easily reduced by an error in positioning the terminal and the IC card relative to each other, so that the current induced in the opposed sheet coil is changed and cannot be constantly maintained with stability, resulting in deterioration of the reliability of data transmitted between the terminal and the IC card. The conventional non-contact type IC cards exhibit these drawbacks.

SUMMARY OF THE INVENTION

In view of the above-described problems, an object of the present invention is to provide an electromagnetic non-contact type IC card in which the area occupied by the coils is reduced by using smaller and thinner data transfer coils, and in which parallel data transmission is effected between a terminal and the IC card at a high speed with improved reliability.

In other to achieve this object, according to one aspect of the present invention, there is provided a non-contact type IC card based on an electromagnetic induction system wherein, to effect N-bit parallel data transfer between the card and a terminal unit for reading or writing data to the card, N thin-film coils formed of at least one layer of a laminated spiral electrically conductive pattern formed by thin-film technology are arranged on an insulating base at a position in the IC card close to the terminal unit facing the terminal unit.

According to another aspect of the present invention, each of the N thin-film coils is formed as a thin-film pot core coil having a pot core formed by thin-film technology.

According to still another aspect of the present invention, shielding walls for shielding from lines of magnetic force formed by the thin-film technology are provided between adjacent coils of the N-thin-film pot core coils.

According to a further aspect of the present invention, one or a plurality of thin-film pot core coils and shielding walls are covered with an insulating material by molding to form a coil module.

In the non-contact type IC card of the present invention, for N-bit parallel data transfer between the card and the terminal unit, N thin-film coils formed of at least one layer of a laminated spiral electrically conductive pattern formed by thin-film technology are arranged on an insulating base, thereby achieving an increase in the data transfer rate.

According to a still further aspect of the present invention, the N coils are thin-film pot coils formed by thin-film technology, thereby preventing leakage of lines of magnetic force and stabilizing the signal even when the IC card and the terminal are incorrectly positioned.

According to a still further aspect of the present invention, shielding walls for shielding from lines of magnetic force formed by thin-film technology are provided between the adjacent coils of the N thin-film pot core coils, thereby preventing interference between the adjacent coils on each of the terminal unit or the IC card and enabling the coils to be arranged at a high density.

According to a still further aspect of the present invention, the thin-film pot core coils and the shielding walls are covered with an insulating material by molding to form a coil module which is easy to handle.

BRIEF DESCRIPTION OF THE DRAWINGS

FIGS. 11(a)–11(g) and 12(a)–12(g) are plan views and sectional side views of a process for manufacturing the pot core coils in accordance with the present invention;

DESCRIPTION OF THE REFERRED EMBODIMENT

Figure 1:
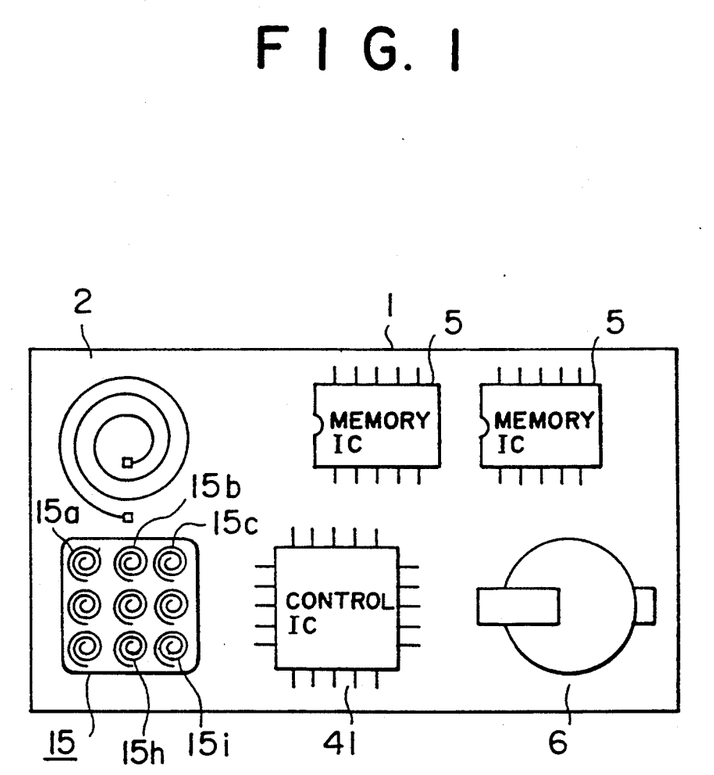
FIG. 1 is a schematic illustration of internal parts of a non-contact type IC card in a mounted state in accordance with the present invention.
Figure 2:
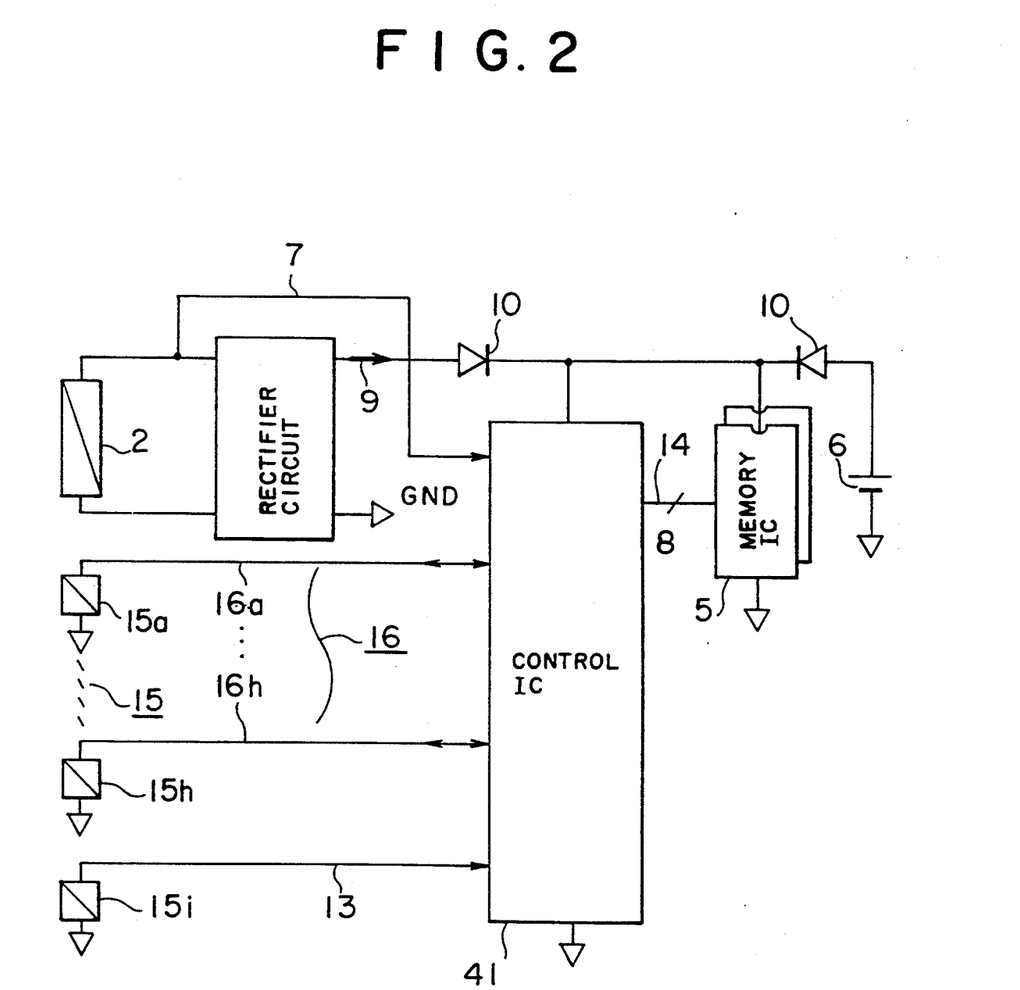
FIG. 2 is a block diagram of electrical connection of the IC card shown in FIG. 1.

An embodiment of the present invention will be described below with reference to the accompanying drawings. FIG. 1 schematically shows internal parts of a non-contact type IC card in a mounted state in accordance with an embodiment of the present invention. This IC card performs, for example, N=8 bit parallel data transmission. The components of this embodiment corresponding or identical to those of the arrangement shown in FIG. 13 are indicated by the same reference characters. A thin-film coil module 15 has nine coils: eight transmitting/receiving thin-film coils 15a to 15h for effecting 8-bit parallel data transmission, and one instruction signal receiving coil 15i for receiving instruction signals. These coils are arranged in a 3×3 form and are molded in an insulating material by. The nine thin-film coils 15a to 15i may be integrally combined and formed as the thin-film coil module 15 or may be formed separately from each other. The arrangement of the coils 15a to 15i is not limited to that shown in FIG. 1 the coils 15a to 15i may be suitably arranged according to the available mounting space. A control IC 41 is provided which can control transmission/reception of 8-bit parallel data. FIG. 2 is a block diagram of electrical connections of the IC card shown in FIG. 1. The thin film coils 15a to 15h and transmitted/received data lines 16a to 16h are used in common for bidirectional data transfer for reception and transmission of 8-bit parallel data. The control IC 41 determines whether or not an instruction received from the instruction signal line 13 is a data write instruction or a data read instruction, and effects bidirectional control of 8-bit parallel data in accordance with this instruction. A device, e.g., a general purpose gate IC "74HC245" or its equivalent in functions may be used for an input stage of the control IC 41.

Figure 3A:
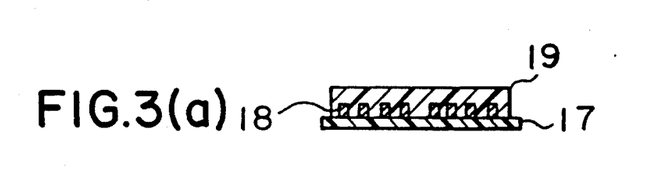
FIGS. 3(a) and 3(b) are a sectional side view and a plan view of a thin-film coil having a one-layer spiral coil winding.
Figure 3B:
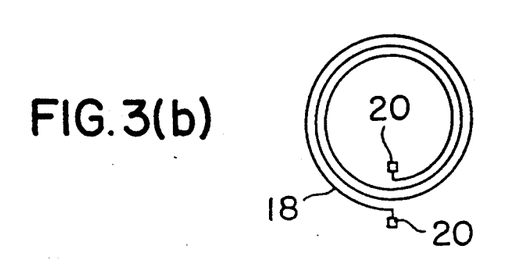
Figure 4A:
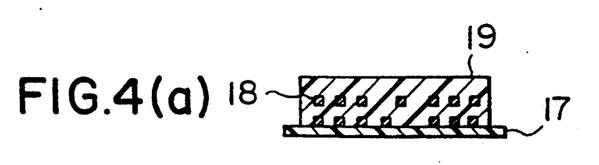
FIGS. 4(a) and 4(b) are a sectional side view and a plan view of a thin-film coil having a laminated spiral coil winding.
Figure 4B:
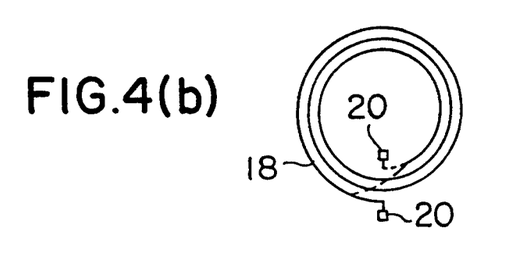
Figure 5A:
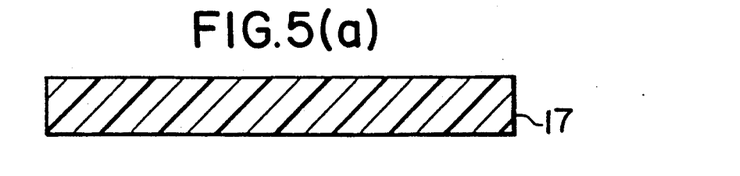
FIGS. 5(a)–5(f) illustrate a process for manufacturing the thin film coil shown in FIG. 3.
Figure 5B:
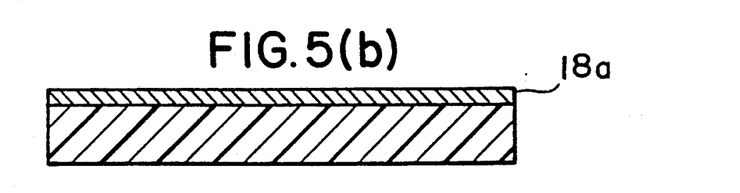
Figure 5C:
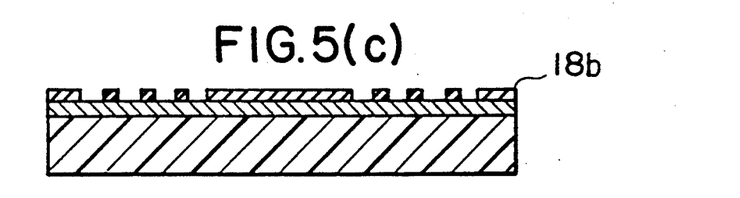
Figure 5D:
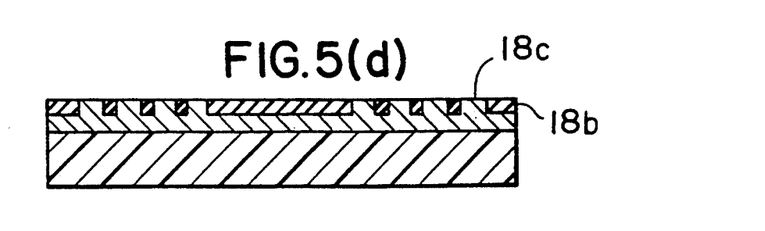
Figure 5E:
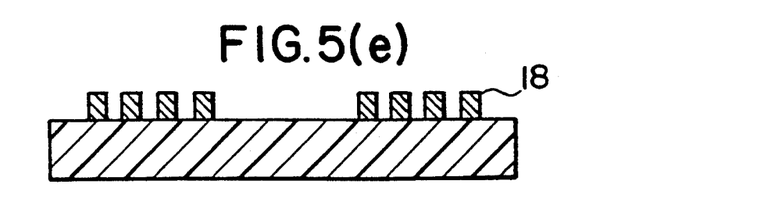
Figure 5F:
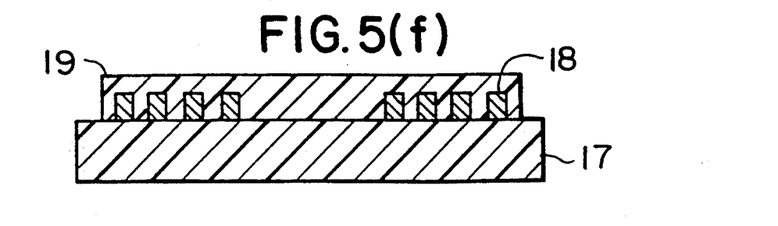

FIGS. 3(a)–4(b) show enlarged views of examples of one of the coil elements of the thin-film coil module shown in FIG. 1. FIGS. 3(a) and 3(b) show a thin-film coil having a one-layer spiral coil winding; FIGS. 4(a) and 4(b) show a thin-film coil having a laminated spiral coil winding; FIGS. 3(a) and 4(a) are sectional side views; and FIGS. 3(b) and 4(b) are plan views showing coil windings alone viewed from above. The thin-film coils shown in FIGS. 3(a)–4(b) are formed by, for example, the present technology relating to manufacture of thin-film coils for thin-film magnetic heads used for stationary hard disk units (hereinafter referred to as "thin-film technology"). Pads 20 for connection to the circuit are also formed at the two ends of the coil winding 18. The present thin-film technology enables manufacture of a 48 turn spiral coil having widths of 0.2 to 0.3 mm and a thickness of 0.01 mm. In this embodiment, 10 turn spiral coils having several millimeter (mm) widths may be formed. It is therefore possible to form a group of coils occupying a smaller area in comparison with the conventional coils.

The following equation represents the relationship between the inductance, the number of coil winding turns, and the inside and outside diameters the coil windings, which is used in inductance design:

$$L = 20.32 a^2 n^2 / (6a + 10c) [nH]$$

where $a = (d_o + d_i)/4$, $c = (d_o + d_i)/2$, $d_o$ = outside diameter ($\mu m$), $d_i$ = inside diameter, and n = number of turns. That is, the inductance of the spiral coil is increased if the number of turns and the outside diameter are larger and if the difference between the inside and outside diameters is minimized. Accordingly, to provide many spiral coils having a substantial inductance in a restricted area on the printed circuit board, the inside and outside diameters are set close to each other and the pitch of the spiral pattern formed in the narrow area defined by the inside and outside diameters is reduced to maximize the number of turns. According to the conventional method of forming a coil winding by etching a copper foil on a printed circuit board, the etching pattern width and the pattern spacing are about 100 $\mu m$ at the minimum. In contrast, the thin-film technology makes it possible to reduce the corresponding size to several microns ($\mu m$) as well as to form a very thin lamination. Consequently, it enables a reduction in the diameter of the thin film coil and, hence, a reduction in the area in which the thin-film coils are mounted on the printed circuit board. h FIGS. 5(a)–5(f) illustrate a process of manufacturing the thin-film coil based on the thin-film technology. This process will be schematically described below. First, as shown in of FIG. 5(b), copper substrate sputtering is performed over the upper surface of an insulating base 17 shown in of FIG. 5(a) to form a copper substrate layer 18a having a thickness of about 0.1 $\mu m$ on the whole insulating base 17 surface. Next, portions on which the coil winding 18 is not to be formed are covered with a resist 18b by resist patterning, as shown in of FIG. 5(c). That is, the pattern of the resist 18b is formed as a reversal pattern for the coil pattern. Copper coil pattern plating is thereafter performed to form a plating portion 18c on the surface of the copper substrate layer 18a corresponding to coil winding 18, as shown in of FIG. 5(d). The thickness of the plating portion is about 2 to 4 $\mu m$. Thereafter, as shown in of FIG. 5(e), the resist 18b is removed and unnecessary portions of the copper substrate layer 18a are also removed by sputter etching, thereby forming the coil winding 18 on the insulating base 17. The coil winding 18 is thereafter covered with an insulating layer 19 as shown in of FIG. 5(f). This is performed by a photoresist insulating layer forming step and a baking step.

Figure 6:
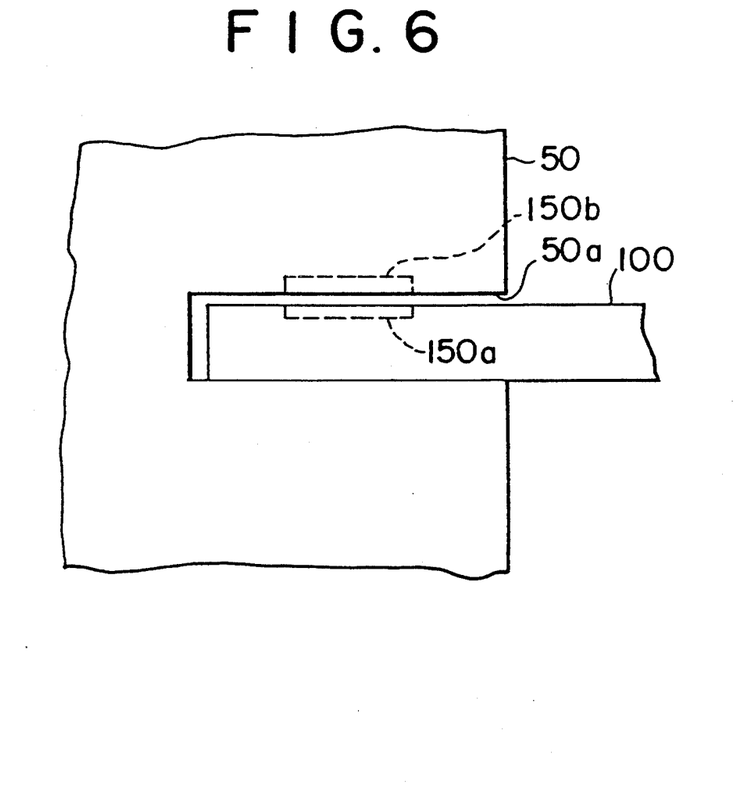
FIG. 6 is a sectional view of the relationship between a terminal unit and the IC card in accordance with the present invention.

As shown in FIG. 6, a thin-film coil module having the same construction (wherein the coils are arranged to face the corresponding coils of the IC card) is also provided in a connector 50a of a terminal unit 50 into which an IC card 100 of the present invention is inserted (for connection). The coil module provided in the connector 50a is disposed in a coil section 150b which is opposed to a coil section 150a of the IC card 100.

The electromagnetic induction non-contact type IC card having the above-described thin coils performs parallel 8-bit data transmission/reception and has a data transfer rate of 500 kbytes/sec (2 μsec/byte) which is 8 times higher than the data transfer rate of the conventional 8 bit serial type IC card. Although this rate is one order of magnitude lower than that of the contact-type multi-pin IC card, the IC card of the present invention is advantageous in that the IC card and the terminal unit have completely sealed structures and can therefore be used in a severe environment in the field of factory automation. Since the area occupied by the coils is reduced and since the data transfer rate is increased, the number of memories 5 and, hence, the memory capacity can easily be increased, as shown in FIGS. 1 and 2.

Figure 7:
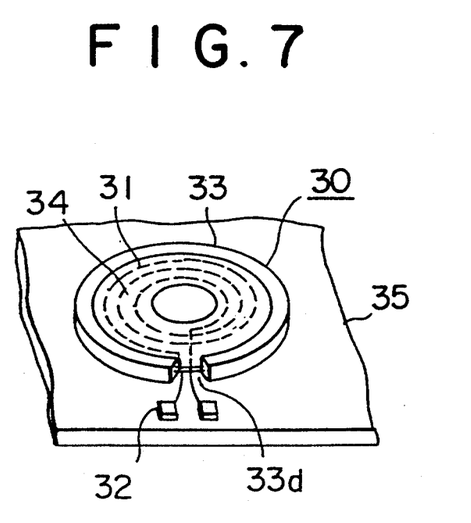
FIG. 7 is an enlarged perspective view of a pot core coil in accordance with the present invention.
Figure 8A:
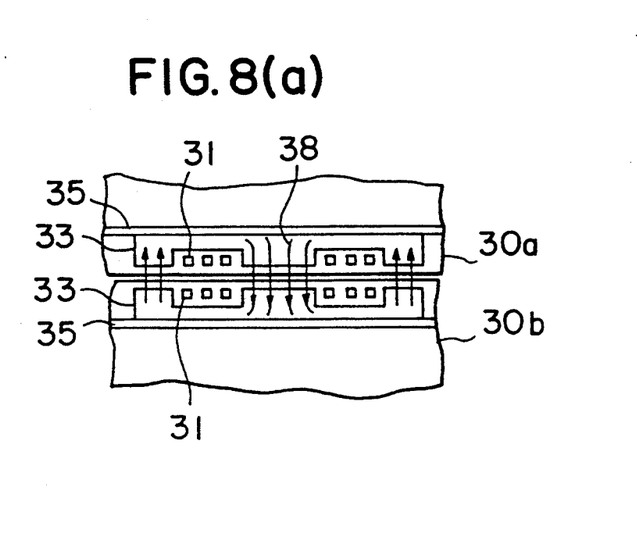
FIGS. 8(a) and 8(b) are sectional side views of lines of magnetic force produced when pot core coils of the IC card and the terminal unit facing each other are coupled by electromagnetic induction.
Figure 8B:
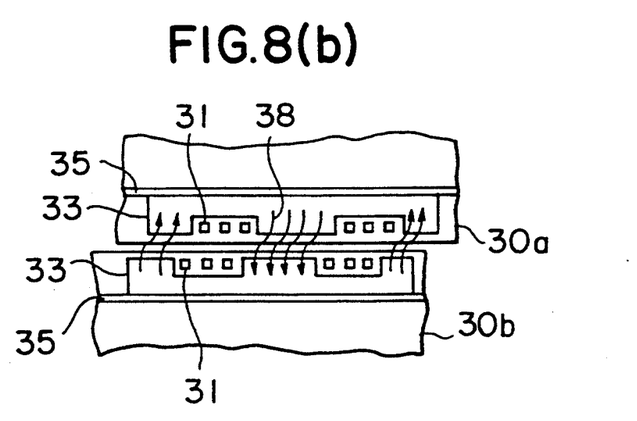

To obtain more stable electromagnetic induction coupling even if the card and the terminal are incorrectly positioned relative to each other, each of the thin-film coils of the thin-film coil module may be provided with a pot core. FIG. 7 is an enlarged perspective view of a pot core coil provided for this purpose, before the coil is covered by molding. FIG. 8(a) is a sectional side view of lines of magnetic force produced by electromagnetic induction coupling of pot core coils of the IC card and the terminal opposed to each other when the IC card and the terminal are connected in correct positions, and FIG. 8(b) is a sectional side view of lines of magnetic force produced by electromagnetic coupling when the positions of the IC card and the terminal and, hence, the pot core coils provided therein are slightly shifted from each other. Referring to FIG. 7, a pot core 33 of a pot core coil 30 formed on an insulating base 35 is E-shaped in section such as to fill a central and surround an outer peripheral portion and a bottom portion of a coil winding 33. A gap 33d for leading the two ends of the coil winding 31 out of the pot core 33 is formed in an outer peripheral portion of the pot core 33. The surface of the coil winding 31 is covered with an insulating layer 34. Pads 32 are attached to both ends of the coil winding 31. The pot core coil 30 is also formed based on the above-described thin-film technology. Consequently, the size of each pot core coil and the overall size of a coil module in which a plurality of pot core coils constructed in this manner are housed are effectively reduced in comparison with the conventional arrangement. A process of manufacturing the pot core coil will be described later.

In the case of an IC card having this type of pot core coil, when the IC card is connected to the terminal while being incorrectly positioned as shown in FIG. 8(b), as well as when the IC card is connected to the terminal while being correctly positioned so that the centers of pot core coils 30a and 30b of the IC card and the terminal coincide with each other as shown in FIG. 8(a), almost all lines of magnetic force 38 produced by the pot core coil 30a of the terminal, for example, are led together to the pot core of the pot core coil 30b of the IC card opposed to the pot core coil 30a and maintained close to the same through a magnetic path having small magnetic reluctance. Even in the state shown in FIG. 8(b), therefore, the magnetic flux leakage is small, and substantially the same electromagnetic induction current as the state shown in FIG. 8(a) is generated in the coil winding 31 of the pot core coil 30b. Thus, if a pot core coil is used which has a structure such that a central portion and a bottom portion connecting these portions surround the coil winding 31 and these are formed of a material such as ferrite having a high relative magnetic permeability, the possibility of an error in data transfer due to an error in positioning the terminal and the IC card is reduced. Since a material such as ferrite having a high relative magnetic permeability is used to form the pot core, the number of turns, the diameter of the coil and the coil current can be reduced in comparison with sheet coils formed on a printed circuit board by the conventional method, while substantially the same electromagnetic induction current is generated.

Figure 9:
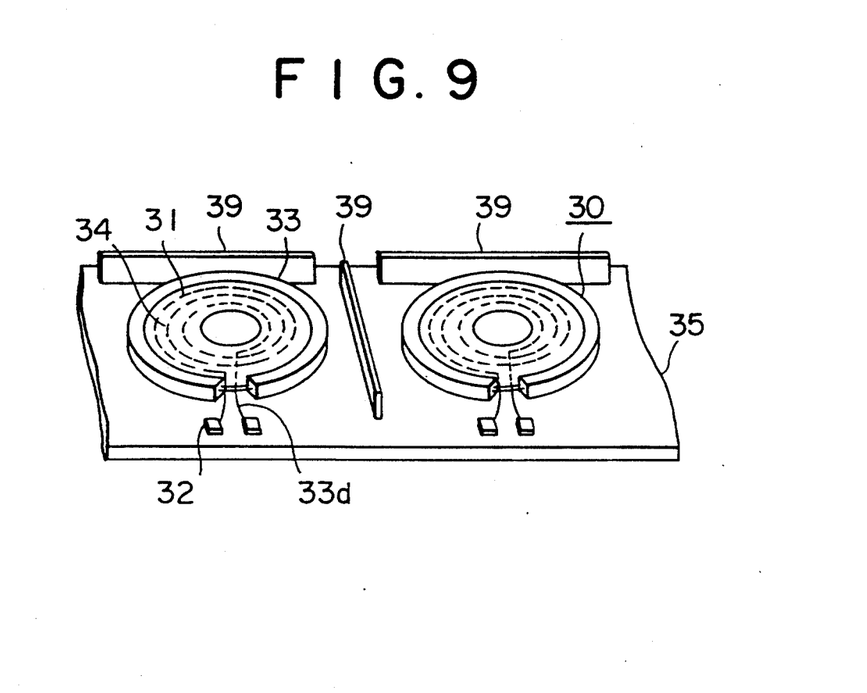
FIG. 9 is a perspective view of a state in which shielding walls are provided between the pot core coils in accordance with the present invention.
Figure 10:
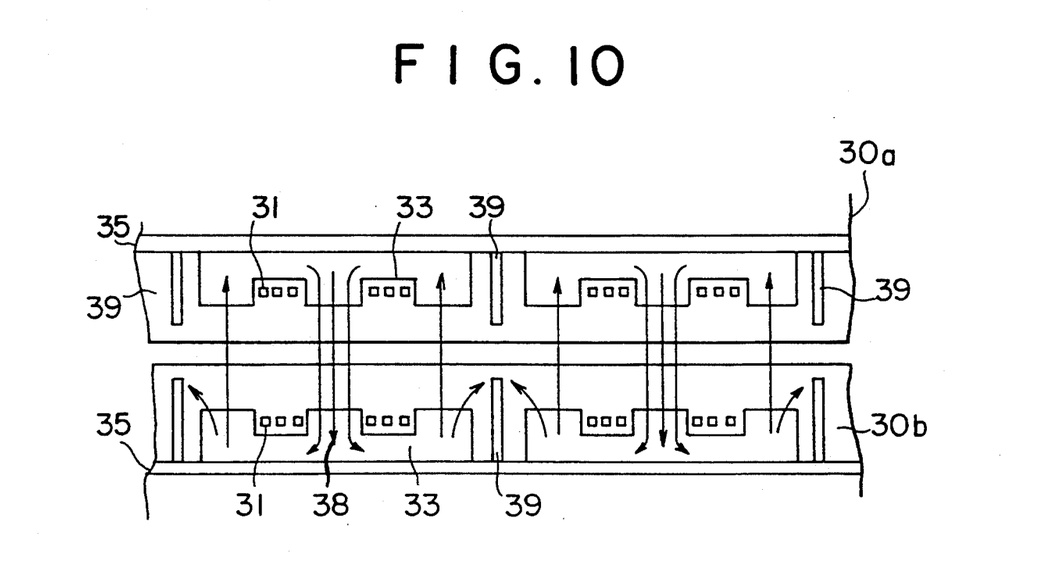
FIG. 10 is a sectional side view of lines of magnetic force produced when the opposed pot core coils of the terminal unit and the IC card with shielding walls shown in FIG. 9 are coupled by electromagnetic induction.
Figure 11A:
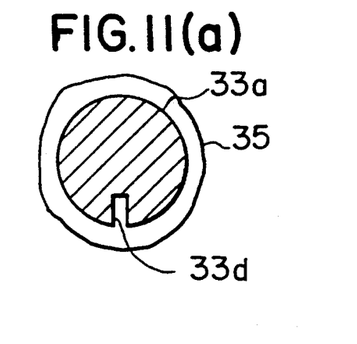
Figure 11B:
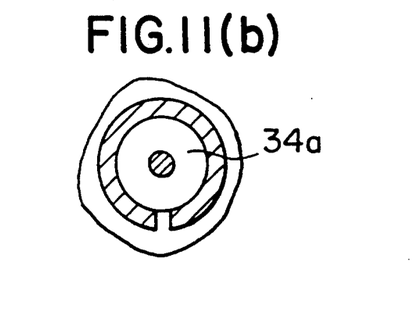
Figure 11C:
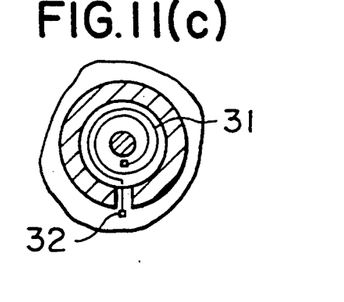
Figure 11D:
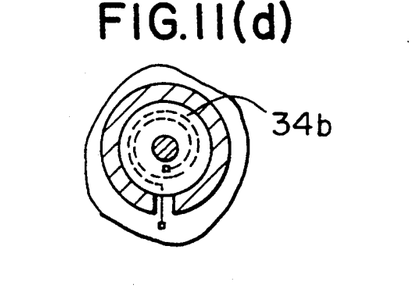
Figure 11E:
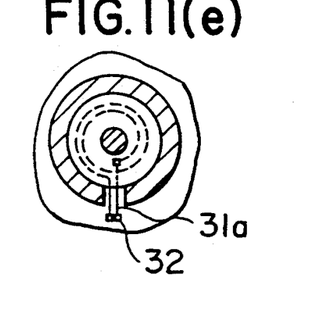
Figure 11F:
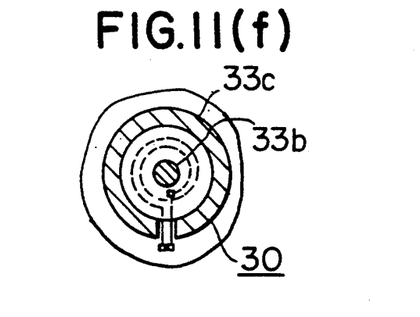
Figure 11G:
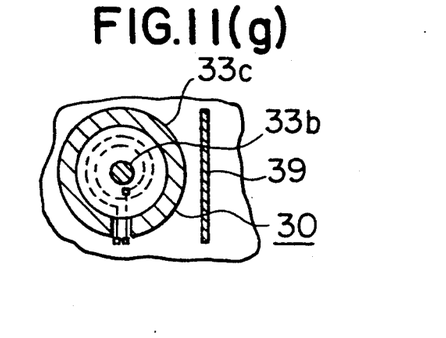
Figure 12A:
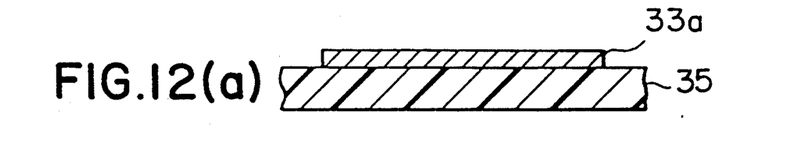
Figure 12B:
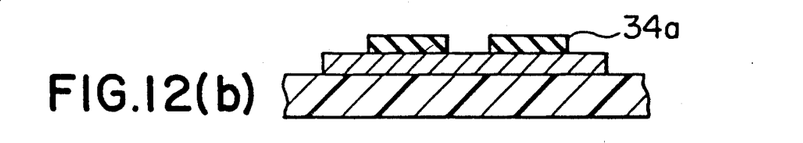
Figure 12C:
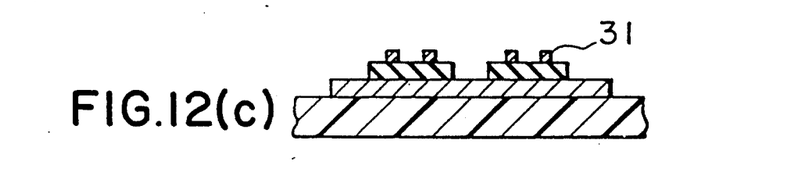
Figure 12D:
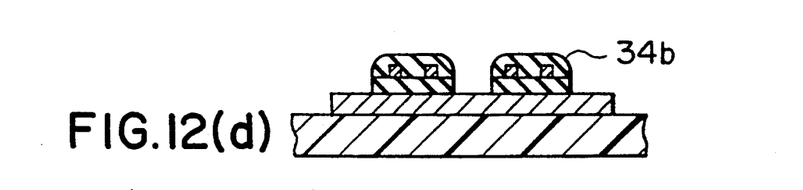
Figure 12F:
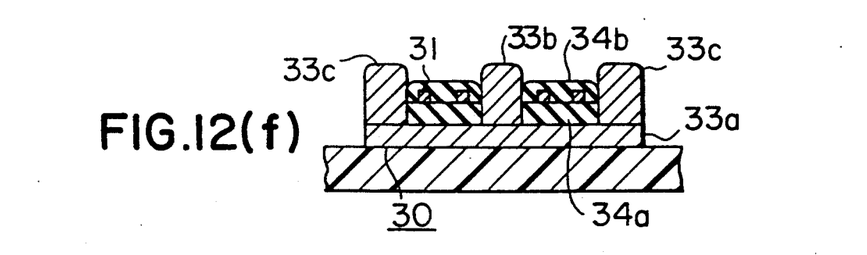
Figure 12G:
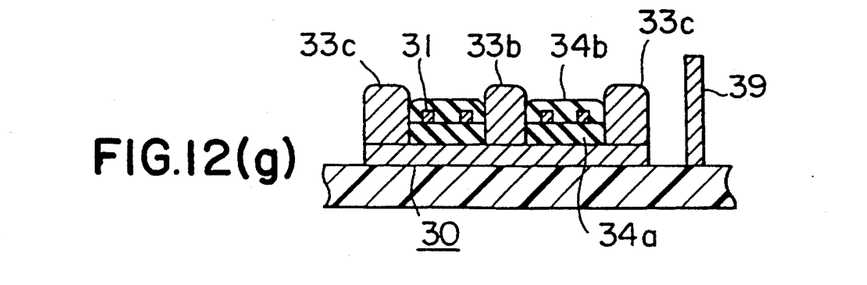

In a case where a plurality of coils are disposed close to each other on each of the IC card and the terminal, there is a possibility of leakage of magnetic force lines, i.e., interference between, for example, adjacent coils of the IC card and, hence, a possibility of a failure to correctly transmit data. To cope with this problem, shielding walls may be provided between adjacent pot core coils. FIG. 9 is a perspective view of part of a pot core module having shielding walls before the coil module is covered by molding, and FIG. 10 is a sectional side view of magnetic force lines produced when the pot core coils of the terminal unit and the IC card with the shielding walls are coupled by electromagnetic induction. As illustrated, almost all the magnetic force lines 38 produced by the pot core coil 30a of the terminal interlink with the pot core coil 30b of the IC card facing the pot core coil 30a. The magnetic force lines leaking from the outer peripheral portion of the pot core coils 30b of the IC card strike shielding walls 39 and are absorbed therein as an energy loss, and the possibility of the magnetic flux leakage influencing the adjacent pot core coils or unassociated pot core coils of the terminal facing the IC card is therefore very small. Consequently, it is possible to prevent interference between adjacent coils, to mount the coils at a high density in a restricted area and to reduce the area occupied by the coils. The shielding walls 39 may be formed of an electrically conductive material such as aluminum and may have a height higher than that of the core and a width, thinner than that of the outer peripheral portion of the core. The shielding walls 39 are formed based on thin-film technology like the pot cores, the coil winding and the insulating layer.

Next, a process of manufacturing a pot core coil will be described below with reference to FIGS. 11(a)–11(g) show plan views of a pot core coil, and FIGS. 12(a)–12(g) show sectional side views of the same. In the process step of FIGS. 11(a) and 12(a), a magnetic material (which is, preferably, a ferromagnetic material such as ferrite or permalloy) is attached by pattern plating on an insulating base (substrate) 35 formed of glass or ceramic to form a pot core bottom portion 33a. At this time, a gap 33d for leading out the coil winding 31 is also formed. In process step of FIGS. 11(b) and 12(b), a photoresist insulating layer 34a is formed into a doughnut-like shape, and baking is thereafter effected. In a process step of FIGS. 11(c) and 12(c), a spiral electrically conductive pattern, e.g., a copper coil, is formed by pattern plating to form the coil winding 31 and pads 32 at the two ends thereof. The coil winding 31 is formed by the same manufacturing method as that described above with reference to FIGS. 5(a)–5(g). In the process step of FIGS. 11(d) and 12(d), a photoresist insulating layer 34b is formed into a doughnut-like shape as illustrated as in FIGS. 11(b) and 12(b), followed by baking. A inner end of the coil winding 31, however, is exposed on the insulating layer 34b. In the process step of FIGS. 11(e) and 12(e), a lead 31a extending from the inner end of the coil winding 31 and another pad 32 are formed by pattern plating as in the step of FIGS. 11(c) and 12(c). In the process step of FIGS. 11(f) and 12(f), a ferromagnetic material is attached to a central portion and an outer peripheral portion by pattern plating as in the step of FIGS. 11(a) and 12(a) to form a central pot core portion 33b and an outer peripheral pot core portion 33c having a gap for leading out the coil winding 31. Further, if a shielding wall 39 is formed, an electrically conductive material such as aluminum is, for example, deposited or sputtered to form the shielding wall 39 in the process step of FIGS. 11(g) and 12(g). One or a plurality of pot core coils 30 and shielding walls 39 are fully covered with an insulating material by molding to be used as, for example, the thin-film coil module 15 shown in FIG. 1. In the above-described embodiment, the coil winding in each pot core coil is formed in a one-stage spiral pattern. Alternatively, multi-stage laminated spiral patterns (refer to FIG. 4) may be used. In such a case, the steps of FIGS. 11(b) to 11(d) and 12(b) to 12(d), for example, of the manufacturing process may be repeated a plurality of times, the ends of coil windings being connected to form one continuous winding.

If pot core coils are formed based on the thin-film technology as described above, the thickness and the overall size of each pot core coil and, hence, those of the thin-film coil module in which a plurality of such pot core coils are housed can be reduced.

Because the pot core coil can be formed so as to be reduced in thickness and size, it can also be designed for an IC microcomputer card (a smart card) having a thickness of 0.76 mm in accordance with the ISO specification, and IC microcomputer cards can easily be designed as a non-contact type.

In the above-described embodiment, parallel 8-bit data transfer is performed. However, the present invention is not limited to this. Parallel transmission of N-bit data (N: positive integer) can be effected by providing N data transmitting/receiving coils while considering the mount area. A volatile RAM (random access memory) requiring a data maintenance battery 6 or a non-volatile ROM (read only memory) requiring no data maintenance battery 6 may be selected as the memory IC 5 to achieve the same performance.

As described above, in the electromagnetic induction non-contact type IC card of the present invention, thin film coils reduced in thickness and overall size are formed, and N units of these coils are arranged to effect N-bit (8-bit, in the described embodiment) parallel data transfer. This IC card can therefore transfer data at a speed higher than that of the conventional serial data transfer system. The pot core structure of each thin film coil ensures that data transfer can be performed with improved reliability even when the terminal unit and the IC card are incorrectly positioned. Further, the provision of the shielding walls between adjacent thin-film coils of the terminal or the IC card enables prevention of interference between the adjacent coils, enables the coils to be mounted by being closely arranged with small spacings, and thereby reduces the area occupied by the coil section.

What is claimed is:

1. A non-contact IC card for transmission and reception of a signal between the card and a terminal unit by electromagnetic induction comprising:
   memory means for storing data;
   first coil means for parallel transfer of N-bit data between the card and the terminal unit by electromagnetic induction, said first coil means including an insulating substrate, N thin-film coils disposed on said substrate, where N is an integer greater than one, a respective ferromagnetic pot core for each of said N thin-film coils, each of said N coils including at least one layer of a spiral electrically conductive thin-film pattern surrounded by the respective pot core, and electrically conducting shielding walls disposed on said substrate between adjacent coils and corresponding pot cores for magnetically shielding said thin-film coils from each other;
   second coil means including a coil for receiving from the terminal unit an instruction signal for parallel reading and writing of data and a respective pot core, said coil of said second coil means including at least one layer of a spiral electrically conductive thin-film pattern surrounded by said pot core;
   control means connected between said first and second coil means and said memory means to control reading and writing of the parallel data to said memory means in accordance with the instruction signal; and
   power supply means for receiving electric power from outside of the card by electromagnetic induction.

2. A non-contact IC card according to claim 1 wherein the said thin-film coils of said first and second coil means are an integral module disposed on the insulating substrate, said module including a molded cover.

3. A non-contact IC card according to claim 2 wherein said pot core is selected from the group consisting of ferrite and permalloy and said molded cover is an electrically insulating material.

4. A non-contact IC card according to claim 1 wherein said memory means includes a non-volatile memory, and said power supply means includes a power coil for receiving power from the terminal unit by electromagnetic induction, a clock signal line for supplying a current induced in said power coil to said control means and said memory means as a clock signal, and a rectifier circuit for rectifying the induced current and supplying the rectified current to said memory means and said control means.

5. A non-contact IC card according to claim 1 wherein said memory means includes a volatile memory, and said power supply means includes a power coil for receiving power from the terminal unit by electromagnetic induction, a clock signal line for supplying a current induced in said power coil to said control means and said memory means as a clock signal, a rectifier circuit for rectifying the induced current and supplying rectified power to said memory means and said control means, an internal battery for backup of said memory means, and a circuit for selectively supplying the rectified power from said rectifier circuit and power from said internal battery to said memory means and said control means.

6. A non-contact IC card according to claim 1 wherein N=8 for 8-bit parallel data transfer between the card and the terminal.

7. A non-contact IC card system comprising:
   a non-contact IC card according to claim 1; and
   a terminal unit having third coil means positioned for facing said first coil means of said IC card, for transferring the N-bit parallel data signal, and including N thin-film coils, fourth coil means positioned for facing said second coil means and including a thin-film coil for transferring the instruction signal, and second power supply means for supplying power to said power supply means of said IC card by electromagnetic induction.

* * * * *